(12) United States Patent
Cummings

(10) Patent No.: US 6,971,744 B1
(45) Date of Patent: Dec. 6, 2005

(54) CLIP-ON MAGNIFYING LENS ATTACHMENT FOR EYEGLASSES

(76) Inventor: Toni Cummings, 27 Witwer Rd., Christiana, PA (US) 17509

( * ) Notice: Subject to any disclaimer, the term of this patent is extended or adjusted under 35 U.S.C. 154(b) by 0 days.

(21) Appl. No.: 11/071,611

(22) Filed: Mar. 3, 2005

Related U.S. Application Data

(60) Provisional application No. 60/550,230, filed on Mar. 4, 2004.

(51) Int. Cl.[7] .............................................. G02C 9/00
(52) U.S. Cl. .......................................... 351/47; 351/57
(58) Field of Search .............................. 351/47, 48, 57, 351/58, 44, 41, 158

(56) References Cited

U.S. PATENT DOCUMENTS

| | | | | |
|---|---|---|---|---|
| 3,741,634 A * | 6/1973 | Stoltze | ......................... | 351/57 |
| 5,118,178 A * | 6/1992 | Tuckman | ..................... | 351/57 |
| 6,139,141 A | 10/2000 | Zider | .......................... | 351/57 |
| 6,488,372 B1 * | 12/2002 | Park | ............................. | 351/47 |
| 6,729,722 B1 * | 5/2004 | Park | ............................. | 351/47 |
| 6,783,234 B1 * | 8/2004 | Hong | .......................... | 351/47 |
| 6,789,893 B1 * | 9/2004 | Hong | .......................... | 351/47 |

* cited by examiner

*Primary Examiner*—Hung Xuan Dang
(74) *Attorney, Agent, or Firm*—Goldstein Law Office PC.

(57) ABSTRACT

A clip-on magnifying lens attachment for glasses, which allows people with poor eyesight to read small print. A pair of eyeglass frames having a pair of eyeglass lenses, are secured together by a nose bar. Each of the eyeglass lenses has a top edge and a bottom edge. A pair of auxiliary frames are pivotally securable to the pair of eyeglass frames. The auxiliary frames include magnifying lenses. A linear bar, having a central clip and a pair of side clips extending downwardly therefrom, secures the auxiliary frames together. The auxiliary frames are coupled to the eyeglass frames, wherein the central clip couples to the nose bar and the side clips each couple to the top edge of the eyeglass lenses.

4 Claims, 3 Drawing Sheets

CLIP-ON MAGNIFYING LENS ATTACHMENT FOR EYEGLASSES

CROSS REFERENCES AND RELATED SUBJECT MATTER

This application is a provisional patent application Ser. No. 60/550,230, filed in the United States Patent Office on Mar. 4, 2004.

BACKGROUND OF THE INVENTION

The invention relates to a clip-on magnifying lens attachment for glasses which will allow people who have poor eyesight to read small print.

It's common knowledge that as one gets older their eyesight gets worse. Most pharmacies will have a display of reading glasses designed for purchase by mature consumers who now find small print difficult, if not impossible, to read. As age advances, many consumers require the use of eyeglasses, as well as additional assistance in the form of handheld magnifying glasses, when performing any type of intricate or detailed work. Without the use of magnifying glasses, many senior citizens or otherwise visually impaired consumers would not be able to perform simple tasks, such as looking up a telephone number or thread a needle.

While magnifying glasses are very helpful tools for those consumers with less than perfect vision, there is a major drawback associated with their use. Specifically, handheld magnifying glasses require that they be held in the user's hand. This is quite an inconvenience when doing work that requires the use of both hands. It is frustrating to anyone needing the advantage of a magnifying glass to see properly while also trying to perform delicate arts and crafts work or other tasks where the use of both hands is almost a necessity. Finding themselves in this situation, many consumers try propping up their magnifying glasses or wedging them in a position suitable for use. This solution proves tedious at best. There are a number of self-supporting magnifying glasses available for purchase, however these devices are relatively expensive and, given there rather large size, are inconvenient to carry and not well suited for use that requires an amount of physical movement.

U.S. Pat. No. 6,341,864 to Ng discloses an auxiliary clip on lenses for a pair of spectacles, used for magnification. U.S. Pat. No. 6,139,141 to Zider discloses auxiliary eyeglasses attachable to an eyeglass frame and capable of holding lenses for various uses including magnifying. U.S. Pat. No. 6,488,372 to Park discloses an auxiliary magnifying lens that are attachable to a pair of eyeglasses.

While these units may be suitable for the particular purpose employed, or for general use, they would not be as suitable for the purposes of the present invention as disclosed hereafter.

SUMMARY OF THE INVENTION

It is an object of the invention to produce a clip-on magnifying lens attachment for glasses which will allow people who have poor eyesight to read small print. The present invention includes a pair of eyeglass frames including a pair of eyeglass lenses secured together by a nose bar. Each of the eyeglass lenses has a top edge and a bottom edge. A pair of auxiliary frames are pivotally securable to the pair of eyeglass frames. The auxiliary frames include magnifying lenses. The auxiliary frames are secured to a linear bar. The linear bar has a central clip and a pair of side clips extending downwardly therefrom. The auxiliary frames couple with the eyeglass frames with the central clip coupling with the nose bar and the side clips coupling with the top edge of the eyeglass lenses.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
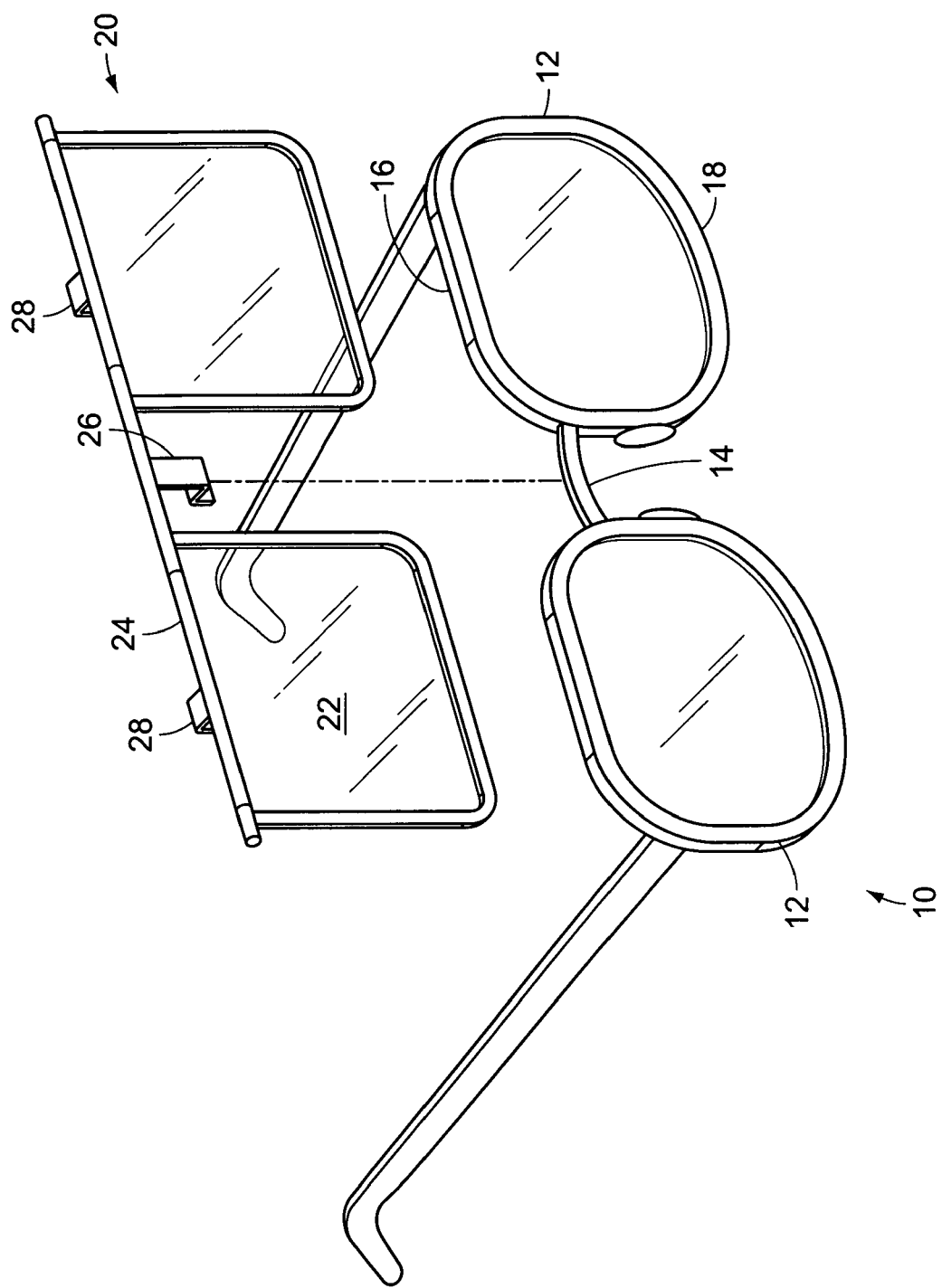
FIG. 1 is an exploded perspective view of the present invention.

FIG. 1 illustrates a clip-on magnifying lens attachment for glasses which will allow people who have poor eyesight to be able to read small print. In its broadest context, the present invention includes a pair of eyeglass frames and a pair of auxiliary frames.

The pair of eyeglass frames 10 include a pair of eyeglass lenses 12 secured together by a nose bar 14. Each of the eyeglass lenses 12 has a top edge 16 and a bottom edge 18. The pair of auxiliary frames 20 are pivotally securable to the pair of eyeglass frames 10. The auxiliary frames 20 include magnifying lenses 22. The auxiliary frames 20 are secured to a linear bar 24. The linear bar 24 has a central clip 26 and a pair of side clips 28 extending downwardly therefrom. The central clip 26 is opposed to the side clips 28. The auxiliary frames 20 couple with the eyeglass frames 10 by the central clip 26 coupling with the nose bar 14 and the side clips 28 coupling with the top edge 16 of the eyeglass lenses 12.

Figure 2:
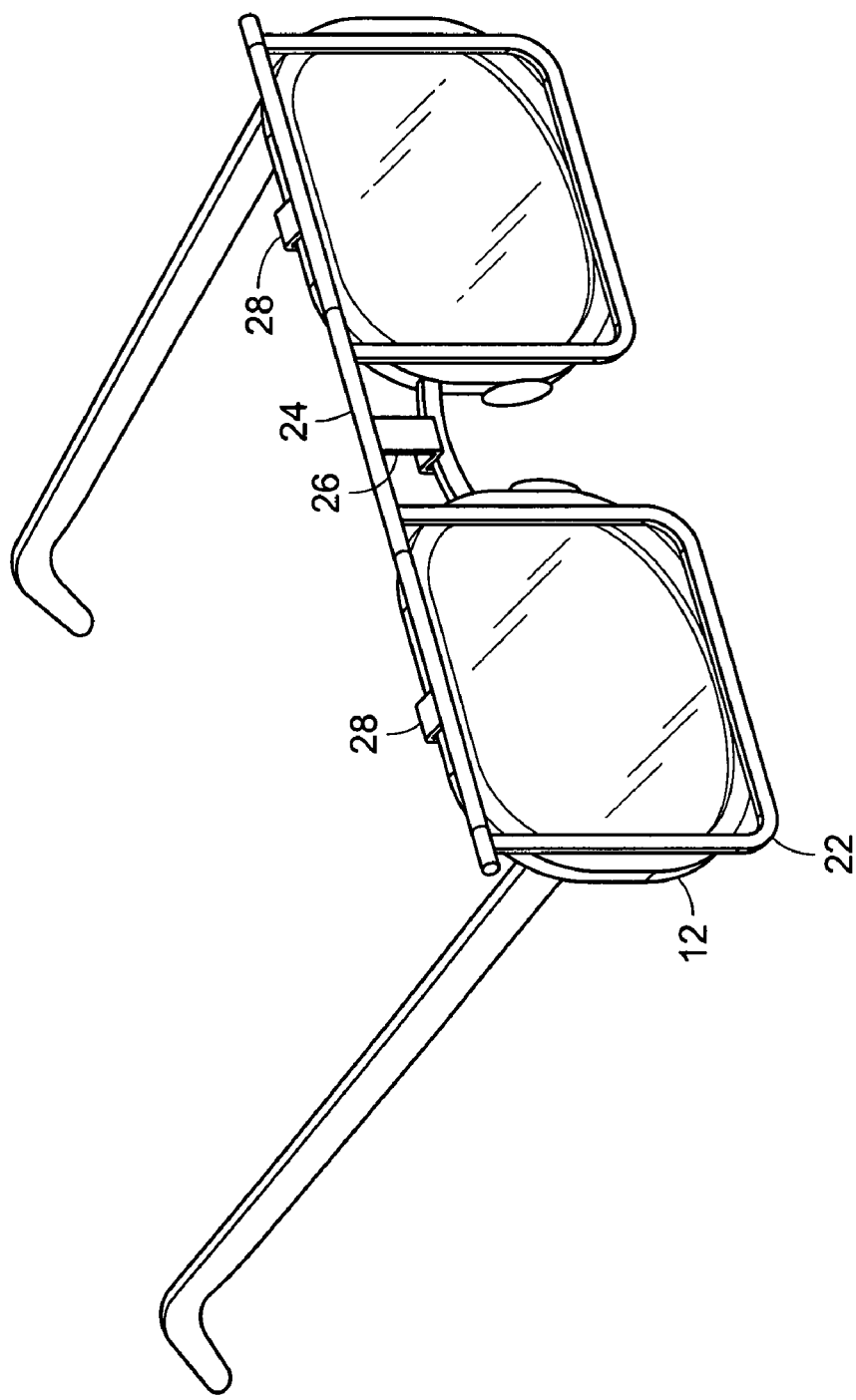
FIG. 2 is a perspective view of the present invention illustrated in use.

FIG. 2 illustrates the magnifying lenses 22 in use. The auxiliary frames 20 are coupled with the eyeglass frames 10 via the central clip 26 and the side clips 28. When secured, the magnifying lenses 22 are aligned with the eyeglass lenses 12 so that the user will essentially be looking through the magnifying lenses 22.

Figure 3:
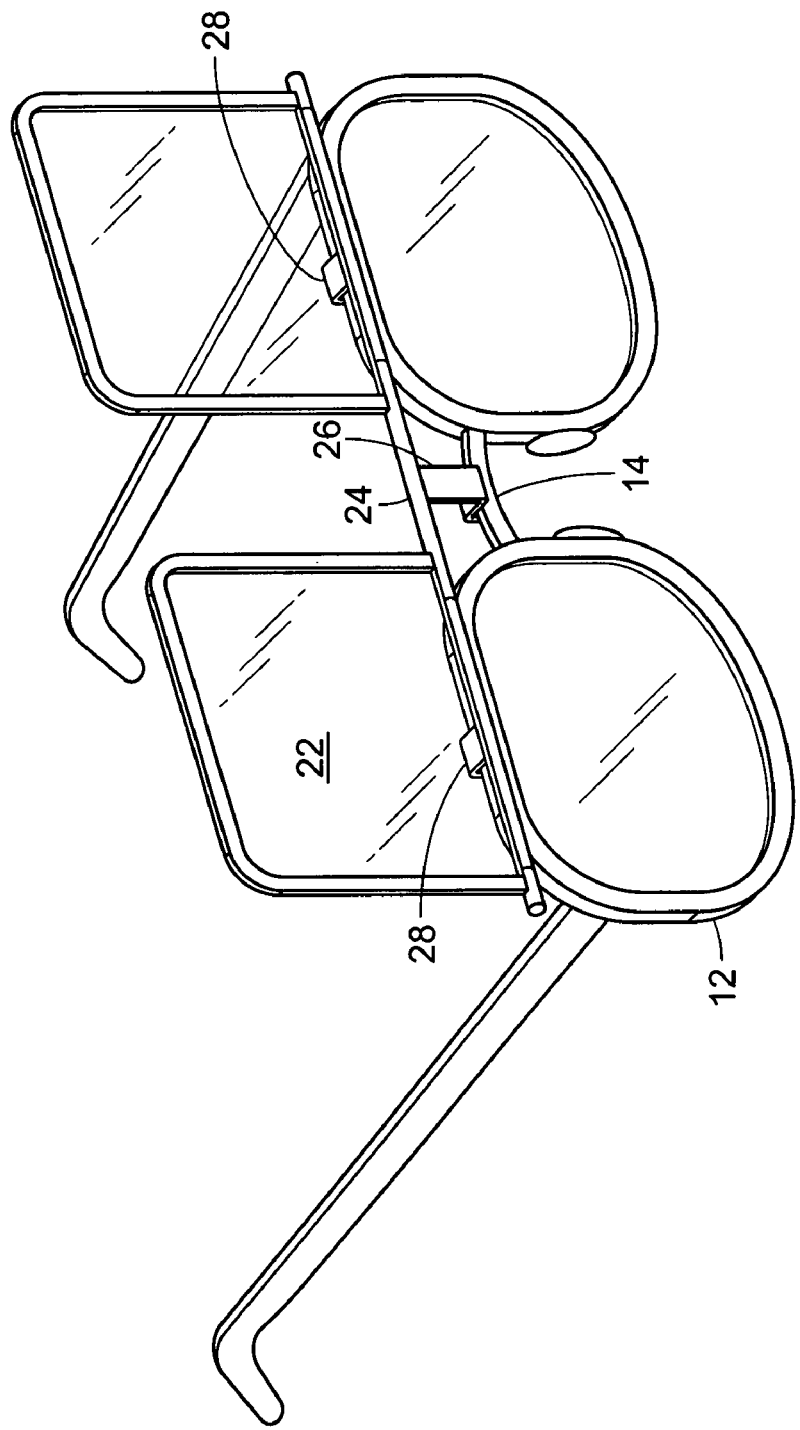
FIG. 3 is a perspective view of the present invention illustrated in use.

FIG. 3 illustrates auxiliary frames 20 coupled to the eyeglass frames 10. The user, when not wanting to look through the magnifying lenses 22, can simply raise the auxiliary frames upwardly, as shown, and easily look through the eyeglass lenses 12.

In conclusion, herein is presented a clip-on magnifying lens attachment for glasses which will allow people who have poor eyesight to be able to read small print. The invention is illustrated by example in the drawing figures, and throughout the written description. It should be understood that numerous variations are possible, while adhering to the inventive concept. Such variations are contemplated as being a part of the present invention.

What is claimed is:

1. A clip-on attachment for eyeglasses having a frame having a pair of eyeglass lenses each having a top edge and a bottom edge, and a nose piece connecting the eyeglass lenses, comprising:

a pair of auxiliary frames, each auxiliary frame having a magnifying lens;

a linear bar connecting the auxiliary frames;

a pair of side clips attached to the linear bar, each side clip adjacent one of the auxiliary frames, each for selectively engaging the top of one of the eyeglass lenses of the eyeglasses; and a central clip attached to the linear bar between the auxiliary frames, the central clip for selectively engaging the nose piece of the eyeglasses.

2. The clip-on attachment for eyeglasses as recited in claim 1, wherein the central clip is opposed to both of the side clips, so that the auxiliary frames may be pivoted upwardly while the side clips remain attached to the eyeglasses.

3. Eyeglasses with clip-on magnifying lenses, comprising:

a frame having a pair of eyeglass lenses each having a top edge and a bottom edge, and a nose piece connecting the eyeglass lenses;

a pair of auxiliary frames, each auxiliary frame having a magnifying lens;

a linear bar connecting the auxiliary frames;

a pair of side clips attached to the linear bar, each side clip adjacent one of the auxiliary frames, each for selectively engaging the top of one of the eyeglass lenses of the eyeglasses; and a central clip attached to the linear bar between the auxiliary frames, the central clip for selectively engaging the nose piece of the eyeglasses.

4. The eyeglasses as recited in claim 3, wherein the central clip is opposed to both of the side clips, so that the auxiliary frames may be pivoted upwardly while the side clips remain attached to the eyeglasses.

* * * * *